US007351147B2

(12) United States Patent
Stockdale et al.

(10) Patent No.: US 7,351,147 B2
(45) Date of Patent: Apr. 1, 2008

(54) STANDARD PERIPHERAL COMMUNICATION

(75) Inventors: James Stockdale, Clio, CA (US); Steven G. LeMay, Reno, NV (US)

(73) Assignee: IGT, Reno, NV (US)

( * ) Notice: Subject to any disclaimer, the term of this patent is extended or adjusted under 35 U.S.C. 154(b) by 27 days.

(21) Appl. No.: 10/214,255

(22) Filed: Aug. 6, 2002

(65) Prior Publication Data

US 2002/0187830 A1 Dec. 12, 2002

(51) Int. Cl.
*A63F 13/00* (2006.01)

(52) U.S. Cl. .......... 463/29

(58) Field of Classification Search .......... 463/20, 463/16, 40; 273/143 R; 710/15, 129
See application file for complete search history.

(56) References Cited

U.S. PATENT DOCUMENTS

| | | | | |
|---|---|---|---|---|
| 4,301,505 A | | 11/1981 | Catiller et al. | 364/200 |
| 4,562,708 A | | 1/1986 | Gros | 70/94 |
| 4,652,998 A | | 3/1987 | Koza et al. | 364/412 |
| 4,685,677 A | * | 8/1987 | Demar et al. | 463/23 |
| 4,799,635 A | | 1/1989 | Nakagawa | 364/900 |
| 5,259,626 A | | 11/1993 | Ho | 273/438 |
| 5,367,644 A | | 11/1994 | Yokoyama et al. | 395/325 |
| 5,379,382 A | | 1/1995 | Work et al. | 395/275 |
| 5,453,928 A | * | 9/1995 | Kaminkow et al. | 463/25 |
| 5,559,794 A | | 9/1996 | Willis et al. | 370/58.3 |
| 5,593,350 A | | 1/1997 | Bouton et al. | 463/36 |
| 5,643,086 A | | 7/1997 | Alcorn et al. | 463/29 |
| 5,708,838 A | | 1/1998 | Robinson | 395/800 |
| 5,721,958 A | * | 2/1998 | Kikinis | 345/555 |
| 5,759,102 A | | 6/1998 | Pease et al. | 463/42 |
| 5,761,647 A | | 6/1998 | Boushy | 705/10 |
| 5,815,731 A | * | 9/1998 | Doyle et al. | 710/10 |
| 5,935,224 A | | 8/1999 | Svancarek et al. | |
| 5,958,020 A | | 9/1999 | Envoy et al. | 710/3 |
| 5,978,920 A | | 11/1999 | Lee | |
| 6,003,013 A | * | 12/1999 | Boushy et al. | 705/10 |
| 6,071,190 A | | 6/2000 | Weiss et al. | 463/25 |
| 6,088,802 A | | 7/2000 | Bialick et al. | 713/200 |

(Continued)

FOREIGN PATENT DOCUMENTS

CA 2 484 568 2/2001

(Continued)

OTHER PUBLICATIONS

"Plug and Play ISA Specification" Version 1.0a, Microsoft and Intel, May 5, 1994.*

(Continued)

*Primary Examiner*—Ronald Laneau
*Assistant Examiner*—Tramar Harper
(74) *Attorney, Agent, or Firm*—Beyer Weaver LLP

(57) ABSTRACT

A disclosed gaming machine has a plurality of "gaming peripherals," each communicating with a master gaming controller via a standard peripheral interface such as the USB (Universal Serial Bus). Further, the gaming peripherals employ a standard peripheral controller and one or more specialized "peripheral devices" (e.g., the actual lights, bill validators, ticket printers, etc. that perform the specific functions of the gaming peripherals). Much of the hardware associated with the peripheral controller is identical from one gaming peripheral to the next. Only a portion of the peripheral controller hardware is specific to the different types of gaming peripherals.

26 Claims, 7 Drawing Sheets

U.S. PATENT DOCUMENTS

| | | | | |
|---|---|---|---|---|
| 6,104,815 | A | 8/2000 | Alcorn et al. | 380/251 |
| 6,106,396 | A | 8/2000 | Alcorn et al. | 463/29 |
| 6,117,010 | A | 9/2000 | Canterbury et al. | 463/20 |
| 6,135,887 | A | 10/2000 | Pease et al. | 463/42 |
| 6,149,522 | A | 11/2000 | Alcorn et al. | 463/29 |
| 6,226,701 | B1 | 5/2001 | Chambers et al. | |
| 6,251,014 | B1 | 6/2001 | Stockdale et al. | |
| 6,263,392 | B1 * | 7/2001 | McCauley | 710/305 |
| 6,270,409 | B1 * | 8/2001 | Shuster | 463/20 |
| 6,270,415 | B1 * | 8/2001 | Church et al. | 463/40 |
| 6,272,644 | B1 | 8/2001 | Urade et al. | |
| 6,279,049 | B1 * | 8/2001 | Kang | 710/15 |
| 6,290,603 | B1 * | 9/2001 | Luciano, Jr. | 463/25 |
| 6,312,332 | B1 | 11/2001 | Walker et al. | |
| 6,375,568 | B1 * | 4/2002 | Roffman et al. | 463/26 |
| 6,503,147 | B1 | 1/2003 | Stockdale et al. | |
| 6,899,627 | B2 | 5/2005 | Lam et al. | |
| 6,968,405 | B1 | 11/2005 | Bond et al. | |
| 7,290,072 | B2 | 10/2007 | Quraishi et al. | |
| 2001/0053712 | A1 * | 12/2001 | Yoseloff et al. | 463/1 |
| 2002/0007425 | A1 * | 1/2002 | Kaysen | 710/14 |
| 2002/0057682 | A1 | 5/2002 | Hansen et al. | |
| 2002/0147049 | A1 | 10/2002 | Carter | |
| 2002/0155887 | A1 | 10/2002 | Criss-Puszkiewicz et al. | |
| 2003/0054880 | A1 | 3/2003 | Lam et al. | |
| 2003/0054881 | A1 | 3/2003 | Hedrick et al. | |
| 2003/0064811 | A1 | 4/2003 | Schlottmann | |
| 2004/0254006 | A1 | 12/2004 | Lam et al. | |
| 2004/0254013 | A1 | 12/2004 | Quraishi et al. | |
| 2004/0254014 | A1 | 12/2004 | Quraishi et al. | |

FOREIGN PATENT DOCUMENTS

| | | | |
|---|---|---|---|
| EP | 0 478 942 | A2 | 4/1992 |
| EP | 0 654 289 | A1 | 5/1995 |
| EP | 0 780 771 | A2 | 6/1997 |
| EP | 0 875 816 | A2 | 11/1998 |
| EP | 0 896 306 | A1 | 2/1999 |
| EP | 1094425 | A2 | 4/2001 |
| EP | 1 189 182 | A2 | 3/2002 |
| EP | 1 189 183 | A2 | 3/2002 |
| EP | 1 255 234 | | 11/2002 |
| EP | 1 255 234 | A2 | 11/2002 |
| GB | 2 254 645 | A | 10/1992 |
| WO | WO 97/41530 | | 11/1997 |
| WO | 00/17749 | | 3/2000 |

OTHER PUBLICATIONS

"Hoyle Casino" Games Domain Reviews. Dec. 1998. [retrieved on May 14, 2003]. Retrieved from the Internet:<URL:http://www.gamesdomain.com/gdreview/zones/reviews/pc/jan99/hc.html>.*

"Leisure Suit Larry's Casino" Ign.com reviews. Sep. 1, 1998. [retrieved on May 14, 2003]. Retrieved from the Internet:<URL:http://pc.ign.com/articles/153/153884p1.html>.*

Levinthal, Adam and Barnett, Michael, "The Silicon Gaming Odyssey Slot Machine," Feb. 1997, COMPCON, '97 Proceedings, IEEE San Jose, CA; IEEE Comput. Soc., pp. 296-301.*

Jim Stockdale, Description of the IGT Netplex Associated Interface System, pp. 1-2; System used in public prior to Oct. 6, 1998.

Levinthal, Adam and Barnett, Michael, "The Silicon Gaming Odyssey Slot Machine," Feb. 1997, *COMPCON '97 Proceedings, IEEE* San Jose, CA; *IEEE Comput. Soc.*, pp. 296-301.

Flandern Van M: "Device Class Definition for Human Interface Devices (HID)" Universal Serial BUS (USB), XX, XX, Jul. 4, 1999, Page COMPLETE, XP002143239, The Whole Document.

Universal Serial Bus (USB), 87 page document entitled "Device Class Definition for Human Interface Devices (HID)", XP-002143239, Firmware Specification Apr. 7, 1999, Version 1.1.

International Search Report, International Appln. No. PCT/US2004/018531, 4 page document entitled "USB Software Architecture In A Gaming Machine", Dated Mar. 2, 2005.

Flandern Van M: "Device Class Definition For Human Interface Devices (HID)" Universal Serial Bus (USB), XX, XX, Jul 4, 1999, page complete, XP002143239, the whole document.

International Search Report, Int'l Appln.: PCT/US2004/018898, 4 page documents entitled: "Protocols And Standards For USB Peripheral Communications".

Morrow, Jim, "An Exploration of why USB (Universal Serial Bus) would be a good choice for inside the slot Machine communications," Downloaded from the web-site, "www.gamingstandards.com," May 9, 2005.

Office Action dated Jan. 30, 2006 from corresponding Canadian Application No. 2,486,648 (4 pages).

Members of B-Link Technical Committee, "Summary of Comment Regarding Adoption of Internal Bus Standard for Electronic Gaming Machines," 2 pgs., Oct. 26, 1999.

European Office Action dated Jul. 24, 2006 from related European Application NO. 04754958.9, 4 pgs.

European Office Action dated Dec. 14, 2006 from related European Application No. 04 755 212.0-1229, 4 pgs.

European Office Action dated Dec. 14, 2006 from related European Application No. 04 754 963.9-1229.

Provisional U.S. Appl. No. 60/094,068 filed on Jul. 24, 1998, entitled: "Input Output Interface and Device Abstraction," 69 pgs.

U.S. Office Action dated Dec. 13, 2006 from related U.S. Appl. No. 10/460,822.

U.S. Office Action dated Oct. 5, 2007 from related U.S. Appl. No. 10/460,822.

SecureWave SecureEXT & SecureNT Version 2.5 Sep. 23, 2002 http://web.archive.org/web/20021003212544/securewave.com/products/secureexe/version2.5.html.

U.S. Office Action dated Jan. 12, 2007 from related U.S. Appl. No. 10/460,826, 10 pgs.

Quraishi et al., Notice of Allowance dated Jun. 21, 2007 and Allowed Claims from related U.S. Appl. No. 10/460,826, 14 pgs.

Universal Serial Bus Specification, Revision 2.0; Apr. 27, 2000.

5 Star Shareware.com, Hoyle Casino 99 Wysiwyg://76/http://www.5starshareware.com/Games/Casino/hoyle-casino99.html.

Provisional U.S. Appl. No. 60/094,068, filed on Jul. 24, 1998, entitled: "Input Output Interface and Device Abstraction" (69 pages).

* cited by examiner

STANDARD PERIPHERAL COMMUNICATION

RELATED APPLICATION DATA

The present application claims priority under U.S.C. 120 from U.S. patent application Ser. No. 09/635,987, titled "STANDARD PERIPHERAL COMMUNICATION" filed on Aug. 9, 2000, which is a divisional application from U.S. patent application Ser. No. 09/414,659, titled "STANDARD PERIPHERAL COMMUNICATION" filed on Oct. 6, 1999, which is now U.S. Pat. No. 6,251,014; each of which is incorporated herein by reference.

BACKGROUND OF THE INVENTION

This invention relates to gaming peripherals for gaming machines such as slot machines and video poker machines. More particularly, the present invention relates to standard peripheral communication connections between the gaming peripheral and the gaming machine.

There are a wide variety of associated devices that can be connected to a gaming machine such as a slot machine or video poker machine. Some examples of these devices are lights, ticket printers, card readers, speakers, bill validators, coin acceptors, display panels, key pads, and button pads. Many of these devices are built into the gaming machine. Often, a number of devices are grouped together in a separate box that is placed on top of the gaming machine. Devices of this type are commonly called a top box.

Typically, the gaming machine controls various combinations of devices. These devices provide gaming features that augment the features of the gaming machine. Further, many devices such as top boxes are designed to be removable from the gaming machine to provide flexibility in selecting the game features of a given gaming machine.

The features of any device are usually controlled by a "master gaming controller" within the gaming machine. For example, during a game the master gaming controller might instruct lights to go on and off in various patterns, instruct a printer to print a ticket or send information to be displayed on a display screen. For the master gaming controller to perform these operations, connections from the device are wired directly into some type of electronic board (e.g., a "back plane" or "mother board") containing the master gaming controller.

To operate a device, the master gaming controller requires parameters, operation features and configuration information specific to each peripheral device. This information is incorporated into software and stored in some type of memory device on the master gaming controller. This device specific software operates the features of the device during a game. As an example, to operate a set of lights, the software for the master gaming controller would require information such as the number and types of lights, features of the lights, signals that correspond to each feature, and the response time of the lights.

One disadvantage of the current operation method for devices controlled by a master gaming controller is that each time a device is replaced the gaming machine must be shutdown. Then, the wires from the device are disconnected from the master gaming controller and the master gaming controller is rewired for the new device. A device might be replaced to change the game features or to repair a malfunction within the device. Similarly, if the circuit board containing the master gaming controller or the master gaming controller itself needs repair, then the wiring from the all the devices connected to the gaming controller must be removed before the gaming controller can be removed. After repair or replacement, the master gaming controller must be rewired to all of the devices. This wiring process is time consuming and can lead to significant down-time for the gaming machine. Further, the person performing the installation requires detailed knowledge of the mechanisms within the gaming machine. Accordingly, it would be desirable to provide a standard communication protocol and/or connection system for installing or removing devices and master gaming controllers that simplifies this wiring process.

Another disadvantage of the current operation method of devices controlled by a master gaming controller involves the software for the devices. When a new device is installed on a gaming machine, software specific to the device must be installed on the master gaming controller. Again, the gaming machine must be shutdown and the person performing this installation process requires detailed knowledge of the gaming machine and the device. Accordingly, it would be desirable to simplify the software installation process.

SUMMARY OF THE INVENTION

This invention addresses the needs indicated above by providing a gaming machine having a plurality of "gaming peripherals," each communicating with a master gaming controller via a standard peripheral interface such as the USB (Universal Serial Bus ). For some gaming peripherals, the communication between the master gaming controller and the gaming peripheral may include various security features such as encryption, secure ports, and secure hubs. Further, the gaming peripherals of this invention preferably employ a standard peripheral controller and one or more specialized "peripheral devices" (e.g., the actual lights, bill validators, ticket printers, etc. that perform the specific functions of the gaming peripherals). Much of the hardware associated with the peripheral controller is identical from one gaming peripheral to the next. Only a portion of the peripheral controller hardware is specific to the different types of gaming peripherals.

One aspect of the present invention provides a gaming machine that generally can be characterized as including (1) a master gaming controller that controls one or more games played on the gaming machine, and (2) a plurality of gaming peripherals coupled to the gaming machine and in communication with the master gaming controller. As described above, the gaming peripheral should include (a) a standard peripheral communications connection, which may be identical in each gaming peripheral (b) one or more peripheral devices specific to the individual gaming peripheral and (c) a peripheral controller that controls the one or more peripheral devices. The peripheral controller preferably includes (i) a control microprocessor that controls communication with the master gaming controller over the peripheral connection (the controller microprocessor is substantially similar in each gaming peripheral), and (ii) a peripheral interface that directly connects to one or more peripheral devices and is specific to the individual gaming peripheral. In one embodiment, the gaming machine includes a mother board with an acceptor for the master gaming controller and a hub containing a plurality of standard communications ports for connecting to the plurality of gaming peripherals. The acceptor is configured to allow the master gaming controller to be removed from the mother board without requiring disconnection of the gaming peripherals from the hub. Further, the mother board is configured to allow additional gaming peripherals to be connected to the master gaming controller without requiring that the mother board be rewired.

In preferred embodiments, the gaming machine is a mechanical slot machine, a video slot machine, a keno game, a lottery game, or a video poker game. One or more of the peripheral devices may be selected from the group consisting of lights, printers, coin hoppers, bill validators, ticket readers, card readers, key pads, button panels, display screens, speakers, information panels, motors, mass storage devices and solenoids.

In preferred embodiments, at least one of the standard communications ports is a secure port, having a level of security exceeding that of other ports on the hub. The secure port is secured by one or more doors, locks, sensors, evidence tapes, or combinations thereof. Further, the master gaming controller may be configured to require that a specified gaming peripheral be connected only through the secure port. Also, the gaming machine may include a plurality of hubs, each containing a plurality of standard communications ports for connecting to the plurality of gaming peripherals, where one or more of the hubs is a secure hub, having a level of security exceeding that of one or more other hubs. The secure hub is secured by one or more doors, locks, sensors, evidence tapes, or combinations thereof. Further, the master gaming controller is configured to require that specified gaming peripherals be connected only through secure hubs.

In one embodiment, the master gaming controller within the gaming machine includes a memory storing 1) software for a standard device identification protocol for at least some of the gaming peripherals, 2) one more device drivers for at least some of the gaming peripherals 3) software for a standard communication protocol that allows communication with the gaming peripherals via the standard communications connection and 4) software for encrypting, decrypting, or encrypting and decrypting communications between the master gaming controller and at least one of the gaming peripherals. The master gaming controller is configured to communicate with a plurality of gaming peripherals connected through hubs with standard peripheral communication connections in the form of a daisy chain where at least one of the gaming peripherals is connected to the hub on the mother board connected to the master gaming controller. Further, the master gaming controller is configured to communicate high-level instructions that do not specify precise control of the peripheral devices of one of the gaming peripherals. Following the high-level instructions, the peripheral controller of at least one gaming peripheral provides low-level instructions precisely controlling the operation of its peripheral devices.

In preferred embodiments, the peripheral controller includes a non-volatile memory arranged to store at least one of a) configuration parameters specific to the individual gaming peripheral and b) state history information of the peripheral. Further, the peripheral controller may include a power converter arranged to convert the voltage coming from the gaming machine to voltages used by the gaming peripheral. Also, the gaming peripheral may include a communications hub including the standard peripheral communications connection for communicating with the master gaming controller and a plurality of standard communications ports for connecting to the plurality of devices within the peripheral.

Another aspect of the invention provides a method for controlling a gaming peripheral on a gaming machine. The method may be characterized as including the following steps 1) sending a high level instruction for controlling the gaming peripheral from the master gaming controller to a peripheral controller associated with the gaming controller via a standard peripheral connection, where the high level instruction does not precisely specify how the gaming peripheral must perform an operation associated with the high level instruction, 2) converting the high level instruction to one or more low level operating instructions, at the peripheral controller, for controlling the operation of one more peripheral devices provided with the gaming peripheral, 3) controlling operation of the one or more peripheral devices with the low level operating instructions. In one embodiment, to send instructions, the master gaming controller a) confirms that the gaming peripheral is communicating with the master gaming controller, b) sends instructions to configure the gaming peripheral via the standard peripheral connection, c) prior to sending the high level instruction, identifies the features of a peripheral device using a standard device identification protocol, d) prior to sending the high level instruction, loads or initializes a device driver for the peripheral device at the master gaming controller, e) determines when the master gaming controller has no device driver precisely matching the gaming peripheral and attempts to identify an available device driver that meets at least some requirements for controlling the gaming peripheral and f) determines when the gaming peripheral has been disconnected or is no longer communicating with the master gaming controller and removes the device driver.

The master gaming controller communicates with one or more peripheral devices selected from the group consisting of lights, printers, coin counters, bill validators, ticket readers, card readers, key pads, button panels, display screens, speakers, information panels, motors, mass storage devices and solenoids. After receiving instructions, the gaming peripheral i) sends a keep alive message to the master gaming controller, where the keep alive message specifies a current operation that is being executed by the gaming peripheral and ii) stores in non-volatile memory state history information in the gaming peripheral where the state history information specifies a recent operating state of the gaming peripheral iii) transmits the stored state history information to the master gaming controller.

Another aspect of the invention provides a gaming machine that may be characterized by the following features: (a) a master gaming controller that controls one or more games played on the gaming machine; (b) a plurality of separately designated communications ports; and (c) a plurality of separately designated gaming peripherals in communication with the master gaming controller via the plurality of communications ports, wherein each of the plurality of gaming peripherals employs a standard communications interface in a manner that requires certain of the separately designated gaming peripherals to communicate only over certain of the separately designated communications ports. For additional security, at least one of the plurality of separately designated communications ports may be a secure port, having a level of security exceeding that of other ports on the hub. Further, some hubs may be made more secure than other hubs. As mentioned, additional security may be provided by, for example, one or more doors, locks, sensors, evidence tapes, electronic keys, and combinations thereof.

These and other features of the present invention will be presented in more detail in the following detailed description of the invention and the associated figures.

DESCRIPTION OF THE PREFERRED EMBODIMENTS

Figure 1:
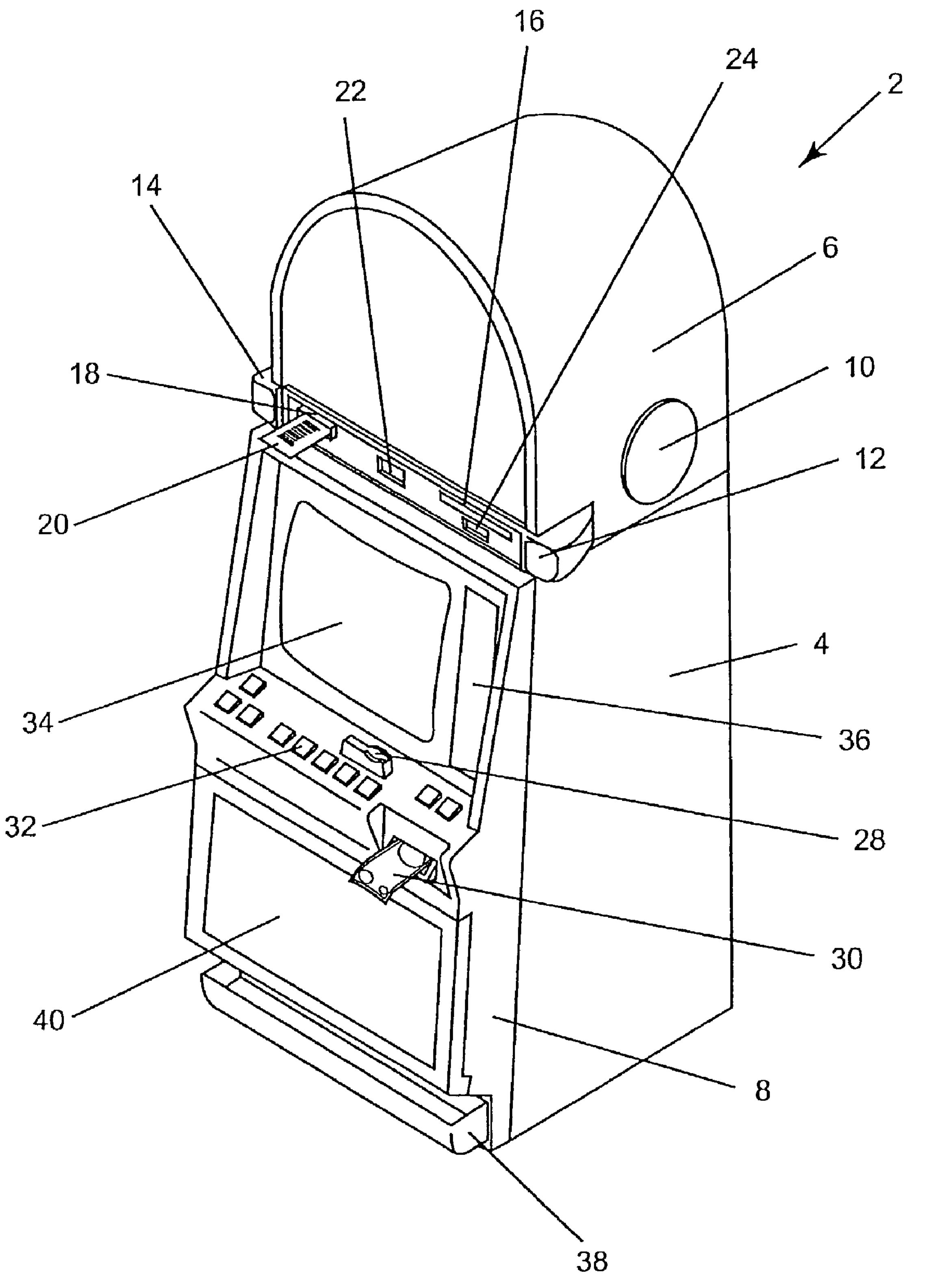
FIG. 1 is a perspective drawing of a gaming machine having a top box and other devices.

Turning first to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine which opens to provide access to the interior of the machine. Typically, the main door 8 and/or any other portals which provide access to the interior of the machine utilize a locking mechanism of some sort as a security feature to limit access to the interior of the gaming machine. Attached to the main door are player input switches 32, a coin acceptor 28, and a bill validator 30, a coin tray 38, a belly glass 40, and a monitor mask 42. Viewable through the main door is a video display monitor 34 and an information panel 36. The display monitor 34 will typically be a cathode ray tube, high resolution flat-panel LCD, or other conventional electronically controlled video monitor. The information panel 36 is a back-lit, silk screened glass panel with lettering to indicate general game information including, for example, the number of coins played. The bill validator 30, player input switches 32, video display monitor 34, and information panel are devices used to play a game on the game machine 2. The devices are controlled by circuitry (not shown) housed inside the main cabinet 4 of the machine 2. Many possible games, including traditional slot games, video slot games, video poker, keno, and lottery, may be provided with gaming machines of this invention.

The gaming machine 2 includes a top box 6, which sits on top of the main cabinet 4. The top box 6 houses a number of devices including speakers 10, 12, 14, a glass panel with display lamps 16, a ticket printer 18 which prints bar-coded tickets 20, a key pad 22 for entering player tracking information, a florescent display 24 for displaying player tracking information, and a card reader 26 for entering a magnetic striped card containing player tracking information. The top box 6 may house different or additional devices than shown in the FIGS. 1 and 2. The devices housed in the top box 6 add features to a game played on the machine 2. During a game, these devices are controlled, in part, by circuitry (not shown) housed within the main cabinet 4 of the machine 2. Peripheral control circuitry in top box 6 also provides some control functions for the top box devices. The top box 6 is designed to be removable from the machine 2. Typically, the top box 6 is replaced to repair a device within the top box 6 or to install a new top box 6 with a different set of devices.

When a user wishes to play the gaming machine 2, he or she inserts cash through the coin acceptor 28 or bill validator 30. At the start of the game, the player may enter playing tracking information using the card reader 26, the key pad 22, and the florescent display 26. During the game, the player views game information using the video display 34. Usually, during the course of a game, a player is required to make a number of decisions which affect the outcome of the game. The player makes these choices using the player input switches 32. During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 including lights behind the front glass 16 on the top box 6 or from lights behind the belly glass 40. After the player has completed a game, the player may receive game tokens from the coin tray 38 or the ticket 20 from the printer 18, which may be used for further games. Further, the player may receive a ticket 20 for food, merchandise, or games from the printer 18.

Figure 2:
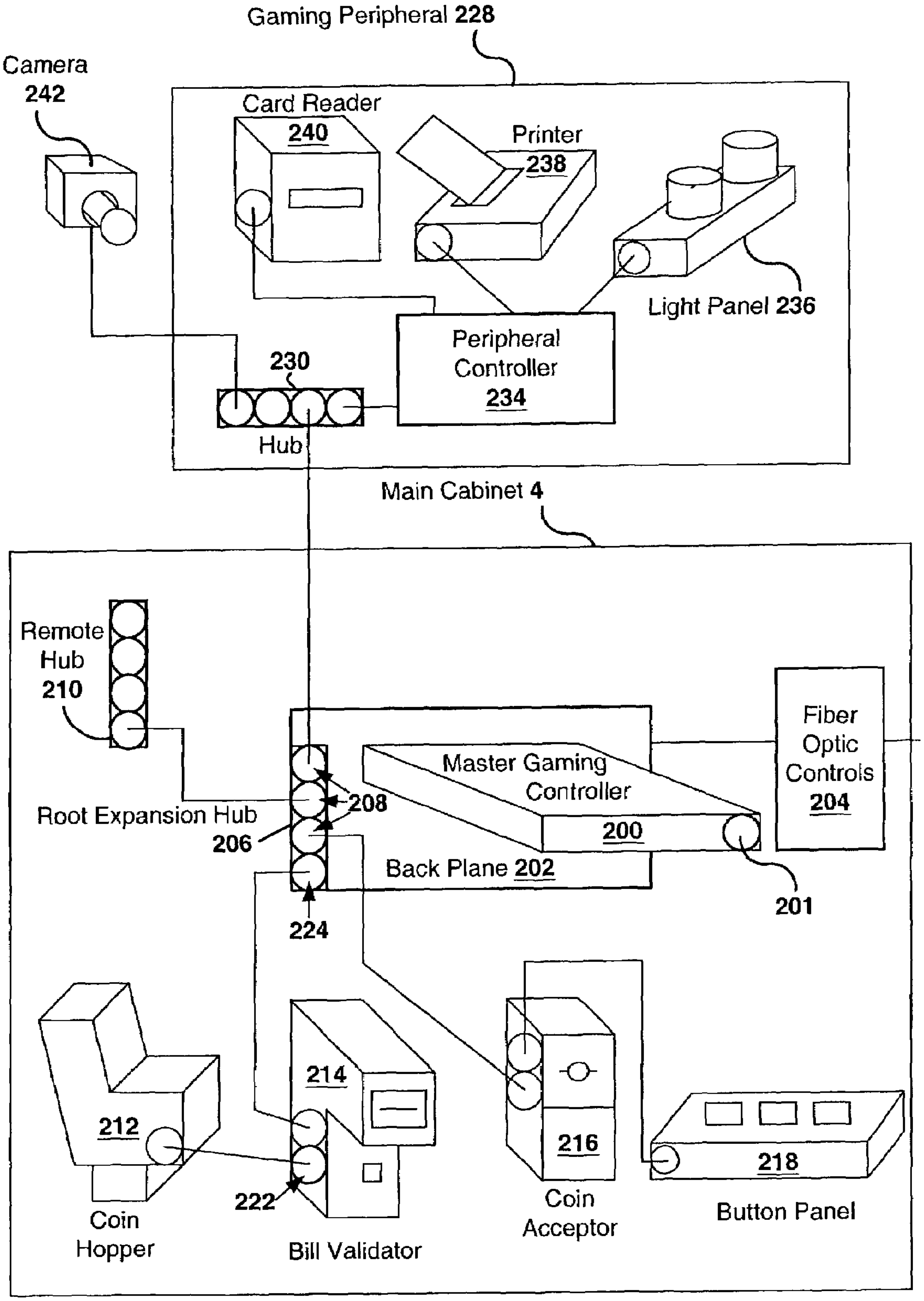
FIG. 2 is a block diagram depicting a gaming peripheral and its connection to a master gaming controller

FIG. 2 is a block diagram depicting a gaming peripheral and its connection to a master gaming controller. The master gaming controller 200 shown in FIG. 2 is housed within the main cabinet 4 of the gaming machine 2 shown in FIG. 1. The master gaming controller 200 controls one or more games played on the gaming machine 2. Typically, the master gaming controller is connected to a mother board or "back plane" 202, which is attached to the back of the main cabinet 4 of the gaming machine 2. The back plane 202 may include an acceptor (not shown) for mechanically engaging or latching to the master gaming controller 200 and a root expansion hub 206 containing one or more standard communications ports 208. The standard communication ports 208 are used to connect to other devices containing standard communication ports.

The standard communication ports 208, root expansion hub 206, hub 210 and hub 230 and the connections to the devices comprise a communication system that allows the master gaming controller 200 to communicate with devices connected to this system. The devices and the connections shown in the figure are only one embodiment of the present invention. Typically, a device is not required to be plugged into a particular port. Examples of devices, which might be connected to a root expansion hub 206 with standard communication ports 208 on a mother board 202 with a master gaming controller 200, include fiber optic conversion 204, a remote hub 210, a coin acceptor 216, a bill validator and a gaming peripheral 228. These devices may be housed within the main cabinet 4 of the gaming machine 2 or may reside outside of the main cabinet 4. Other examples of devices which might incorporate a standard communication port 208 that communicate with the master gaming controller 200, include the coin hopper 212, the bill validator 214, the coin acceptor 216, the button panel 218, the light array 236, the printer 238, the card reader 240, the camera 242, in FIG. 2 and the speaker 10 which is part of an audio system, the display screen 34, the information panel 36, the key pad 22 in FIG. 1. These devices might be connected directly to the mother board 202 containing the root expansion hub 206 using one or more of the standard communication ports 208 or through one or more devices containing standard communication ports, which are connected to the root expansion hub 206 on the mother board 202. For example, the coin hopper 212 is connected to a standard communication port 222 on the bill validator 214. The bill validator 214 is connected to the root expansion hub 206 on the mother board 202 containing the master gaming controller 200. As another example, the camera 242 is connected to the hub 230 on the gaming peripheral 228, which is connected to the root expansion hub 206 on the mother board 202.

The root expansion hub 206, which is integrated into the back plane 202, provides breakout connections for devices within the gaming cabinet without requiring additional hardware or non-integrated communication port expansion including the remote hub 210 or the hub 230. Typically, the connections to the root expansion hub 206 are from a connection to a root port within the circuitry of the master gaming controller 200 (i.e., the root port provided by circuitry incorporated into the master gaming controller 200). When the root expansion hub is connected to a root port on the master gaming controller 200, the root expansion hub 206 may be provided with a higher level of security than the other remote hubs including the hubs 210 and 230. In general, any hub can be provided with more or less security than other hubs in the gaming machine. The security for the hub may be provided by limiting access to the interior of the gaming machine using one or more doors with mechanical and/or electrical locking mechanisms. These locks may be monitored by the master gaming controller 200 using sensor devices including electric switches. Further, the ports 208 and 224 within the root expansion hub may have additional security features. For example, access to the ports may be limited using an electronic key or covers with mechanical locks which prevent access. Further, devices connected to these ports may be locked down to prevent the disconnection of a device. Further, electronic or mechanical sensors including evidence tape may be used on a particular port to determine whether a port has been accessed or not. One or more of these security features as well as other security features may be used to secure specific ports on the root expansion hub 206 or any other ports used to connect devices.

Using the standard communication ports 208 and the root expansion hub 206, the master gaming controller 200 may be removed from the acceptor on the mother board which is attached to the back plane 202 without disconnecting or rewiring any of the devices connected to the standard communication ports 208. Also, additional devices may be connected to the root expansion hub 206 on the mother board 202 without rewiring the mother board 202 and master gaming controller 200. For example, when the remote hub 210 is disconnected from one of the communication ports 208 on the root expansion hub 206 and replaced with a connection to another device, including but not limited to a camera 242, the coin hopper 212, the bill validator 214, or the coin acceptor 216, then the mother board 202 and the master gaming controller 200 would not need to be rewired.

Also, the standard communication ports in the root expansion hub 206, the hub 210, and the 230 may not accept connections to all types of devices to provide additional security. For example, the level of security on the standard communication port 224 might be higher than the other standard communication ports 208 on the root expansion hub 206. Thus, the standard communication port 224 on the root expansion hub 206 might accept connections only from devices requiring a higher level of security including but not limited to the bill validator 214, the coin acceptor 216, and the gaming peripheral 228. In this example, the master gaming controller 200 would not recognize input from the bill validator 214, the coin acceptor 216 or the gaming peripheral unless these devices were connected through a standard communication port with a higher level of security including 224. This security may be provided by mechanical, electronic or software means or combinations thereof. For example, port 224 may be housed within a secure locking enclosure to ensure that no one can connect or disconnect through that port without having the necessary key. As another example, the master gaming controller includes a temporary port or hub 201. Usually, this port 201 is used for an electronic key and is used for diagnostics and other secure operations on the master gaming controller. During operation of the gaming machine, a device is not typically connected through this port. Secure ports and data encryption help to meet the necessary security requirements for a gaming machine.

During the operation of the gaming machine 2, the master gaming controller 200 communicates with devices connected through the system of standard communication ports and connections. The master gaming controller 200 includes a memory storing software for executing a standard communication protocol that allows communication with the various devices using the standard communication connections. This communication protocol may include encryption capability for communicating with one or more devices. The master gaming controller 200 communicates with devices to obtain information about a device including whether it is operating properly or whether it is still connected. In FIGS. 4, 5, 6, and 7, this communication process is described in detail.

During a game, the master gaming controller 200 controls devices. Using the standard communication connections and the standard communication protocol, the master gaming controller 200 may send instructions to a device to perform a specific operation. These instructions may be in the form of low-level or high-level instructions. The master gaming controller 200 sends low-level instructions to devices that it directly controls. Examples of low-level instructions might include turning on a specific light, turning off a specific light, starting a motor, or stopping a motor. The master gaming controller may send high-level instructions to the gaming peripheral 228. A gaming peripheral 228 is a device that contains, for example, a hub 230 with standard communication connections, a peripheral controller 234, and connections to one or more peripheral devices. Typically, the peripheral controller controls one or more peripheral devices. Also, when the communication connections and the standard communication protocol are used, the peripheral controller 234 enables communication between the master gaming controller 200 and one or more peripheral devices. Examples of some peripheral devices, which might be included as part of gaming peripheral 228, are the lights 236, printer 238, smart card reader 240, the bill validator 214, the coin acceptor 216, the button panel 218, in FIG. 2 and the speaker 10, the video display screen 34, the key pad 22, and the florescent display 24 in FIG. 1. The peripheral controller 234 controls the peripheral devices connected to the peripheral controller 234 including the lights 236, the printer 238, and the smart card reader 240. When the master gaming controller 200 sends the high-level instruction to the gaming peripheral 228 requesting an operation from a peripheral device controlled by the peripheral controller 234, the peripheral controller 234 receives a high-level instruction and converts it to the low-level instructions specific to the operation requested from the master gaming controller 200. For example, the master gaming controller 200 might send a high-level instruction to the gaming peripheral 228 to "strobe" its lights 236. The peripheral controller 234 would receive this high-level instruction and send out a series of low-level instructions to the lights 236 including instructions to turn on and off specific lights at specified intervals. As another example, the master gaming controller might send an instruction to the gaming peripheral 228 to "print a coupon", the peripheral controller 234 would receive this high-level instruction and convert it to a series of low-level instructions for the printer 238 including start motor, print string, advance to new line, advance paper, stop motor. The high-level instruction set that allows the master gaming controller 200 to operate a peripheral device on a gaming peripheral 228 with a peripheral controller 234 is stored as device driver software on a memory device on the master gaming controller 200.

Figure 3:
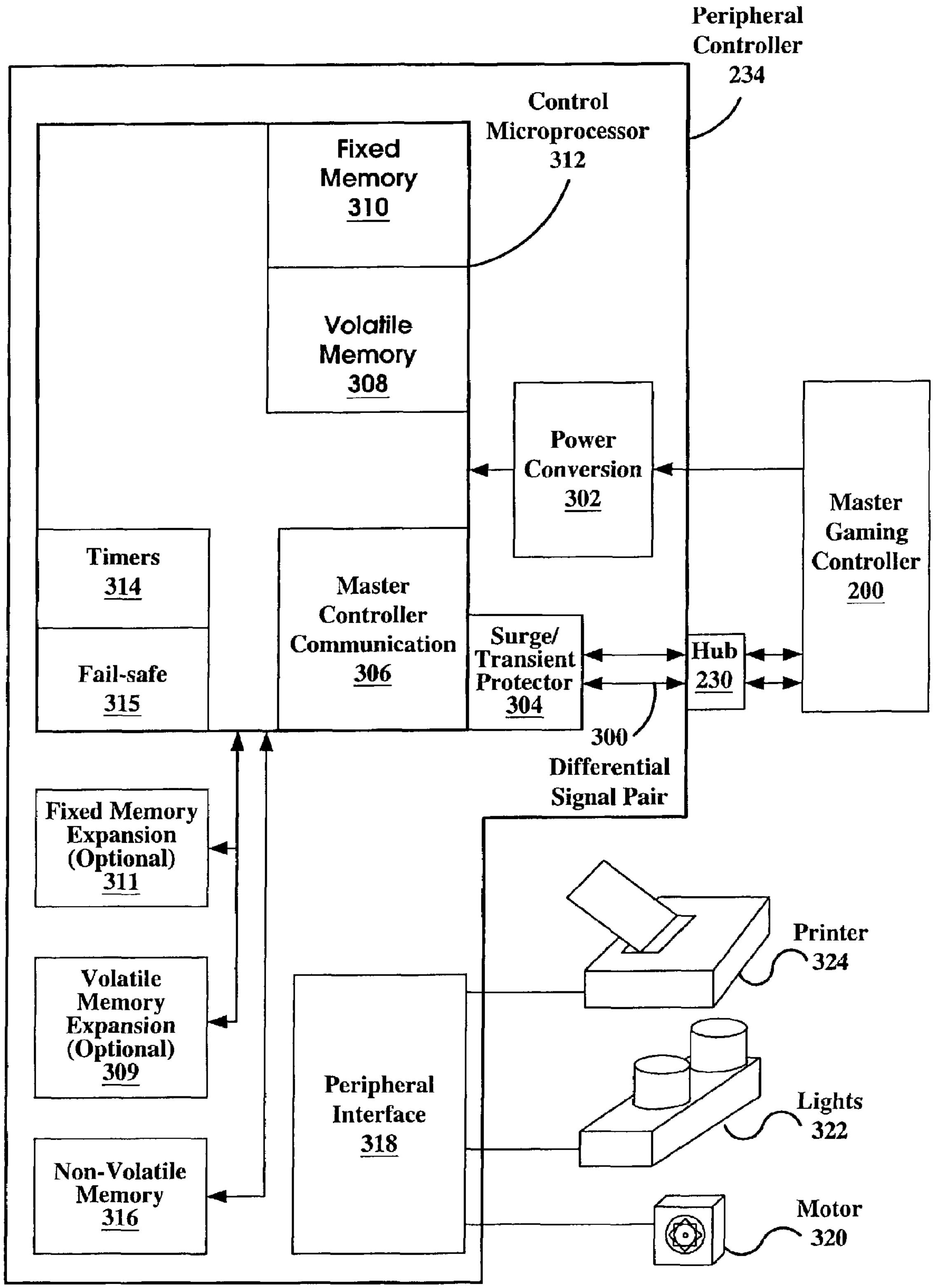
FIG. 3 is a block diagram depicting a more detailed example of a gaming peripheral in accordance with this invention.

FIG. 3 is a block diagram depicting a more detailed example of a gaming peripheral in accordance with this invention. The master gaming controller 200 is connected to the hub 230 which includes standard communication connections on the gaming peripheral. The peripheral controller 234 is connected to the hub 230 using a peripheral connection 300. The peripheral connection 300 is connected to a transient and surge protector 304. The transient and surge protector 304 protects the peripheral controller from signals arriving on the peripheral connections which might damage a control microprocessor 312.

Power from the master gaming controller 200 is transmitted to a power conversion unit 302. The power conversion unit 302 converts the voltage arriving from the master gaming controller 200 to voltages needed for the control microprocessor 312 of the peripheral controller 234 or any of the peripheral devices connected to the peripheral controller 234 including but not limited to the motor 320, the lights 322 or the printer 324. The peripheral devices may also receive power directly from the power supply unit (not shown) with or without using the power conversion unit 302. The power supply unit is usually contained within the main cabinet of the gaming machine.

Hardware needed to connect the peripheral controller 234 to a specific peripheral device is located in the peripheral interface 318. At least one or more peripheral devices are connected to the peripheral interface 318. These peripheral devices may include the motor 320, the lights 322, the printer 324, card readers, key pads, button panels, information panels, display screens, bill validators, and coin acceptors. The configuration of the peripheral controller 234, which includes information about the types of peripheral devices controlled by the peripheral controller 234, is stored in a non-volatile memory 316. When the peripheral devices on a gaming peripheral are changed, the non-volatile memory 316 can be replaced or reprogrammed to incorporate the new configuration.

The peripheral controller contains a control microprocessor 312 that controls communication with the master gaming controller 200. Further, the control microprocessor 312 converts high-level instructions from the master gaming controller 200 requesting specific operations from the peripheral devices controlled by the peripheral controller 234 to low-level instructions needed to perform the operation. In one embodiment, the control microprocessor 312 includes a fixed memory 310, a volatile memory 308, a timer 314, a fail safe 315, and a master controller communication 306. In other embodiments, either the fixed memory 310 or the volatile memory 308 or both may be located outside of the control microprocessor.

The volatile memory 308 and fixed memory 310 may be upgraded using the volatile memory expansion 309 and the fixed memory expansion 311. The fixed memory expansion 311 might be in the form of an EPROM or flash memory. When flash memory is used, it may be possible to field upgrade the operating code of the peripheral controller. The volatile memory expansion 309 might be in the form of static RAM which uses a long-life battery to protect the memory contents when power is removed.

In a preferred embodiment, each gaming peripheral containing a peripheral controller 234 contains an essentially identical control microprocessor 312. In such modular designs, the power conversion circuitry 302 and surge/transient protector circuitry will also be essentially identical from peripheral to peripheral. The only distinctions between peripheral controllers in individual peripherals will reside in the peripheral interface 318 and the information stored in non-volatile memory 316. This allows for rapid design and reduced maintenance of gaming machine peripherals.

Within the control microprocessor 312, the master controller communication 306 controls the communication between the peripheral controller 234 and the master gaming controller 200. The control microprocessor may be an off-the-shelf device including an Infineon Technologies C541U family of microcontrollers. The master controller communication 306 performs the communication using a standard communication protocol. Essentially, it implements the protocol associated with a standard communications protocol such as USB, IEEE1394, or the like. The timer 314 sends signals to the control microprocessor 312 which controls execution of code. The fail-safe 315 contains code which is independent of the code in the control microprocessor 312. When code within the control microprocessor 312 is lost or malfunctions, the fail safe 315 will reset the entire gaming peripheral. As an example, the fail safe 315 might expect a message from the control microprocessor 312, which includes "do not reset." When the fail safe 315 receives this message, the fail safe 315 will wait a specified interval for the next "do not reset" message. When the fail safe 315 does not receive a message including "do not reset" after a specified interval, the fail safe 315 resets the gaming peripheral.

The fixed memory 310 is a read only memory which is not lost when the control microprocessor 312 loses power. The fixed memory 310 stores general code that the control microprocessor 312 uses while operating. The code stored in the fixed memory 310 may be identical in every peripheral controller 234. To control a specific peripheral device, the control microprocessor 312 uses code stored in the fixed memory 310 in conjunction with peripheral device specific information stored in the non-volatile memory 316. The volatile memory 308 stores code, parameters, data from the peripheral devices and data from the master gaming controller 200 that the control microprocessor 312 needs to operate. The data in volatile memory 308 is lost when the control microprocessor 312 loses power. Critical information including the current state of peripheral devices is stored in the non-volatile memory 316. The non-volatile memory might be an EEPROM, flash card memory or a battery powered RAM. In the event of a power failure or some other malfunction, the information in non-volatile memory 316 is used to restore the gaming peripheral to its state before the malfunction occurred. For example, when a player enters cash into the gaming machine 2, this information can be stored in non-volatile memory 316 on the peripheral controller 234. After this information is stored in non-volatile memory, it will be available to determine the state of the machine 2 when any subsequent malfunctions occur.

Figure 4:
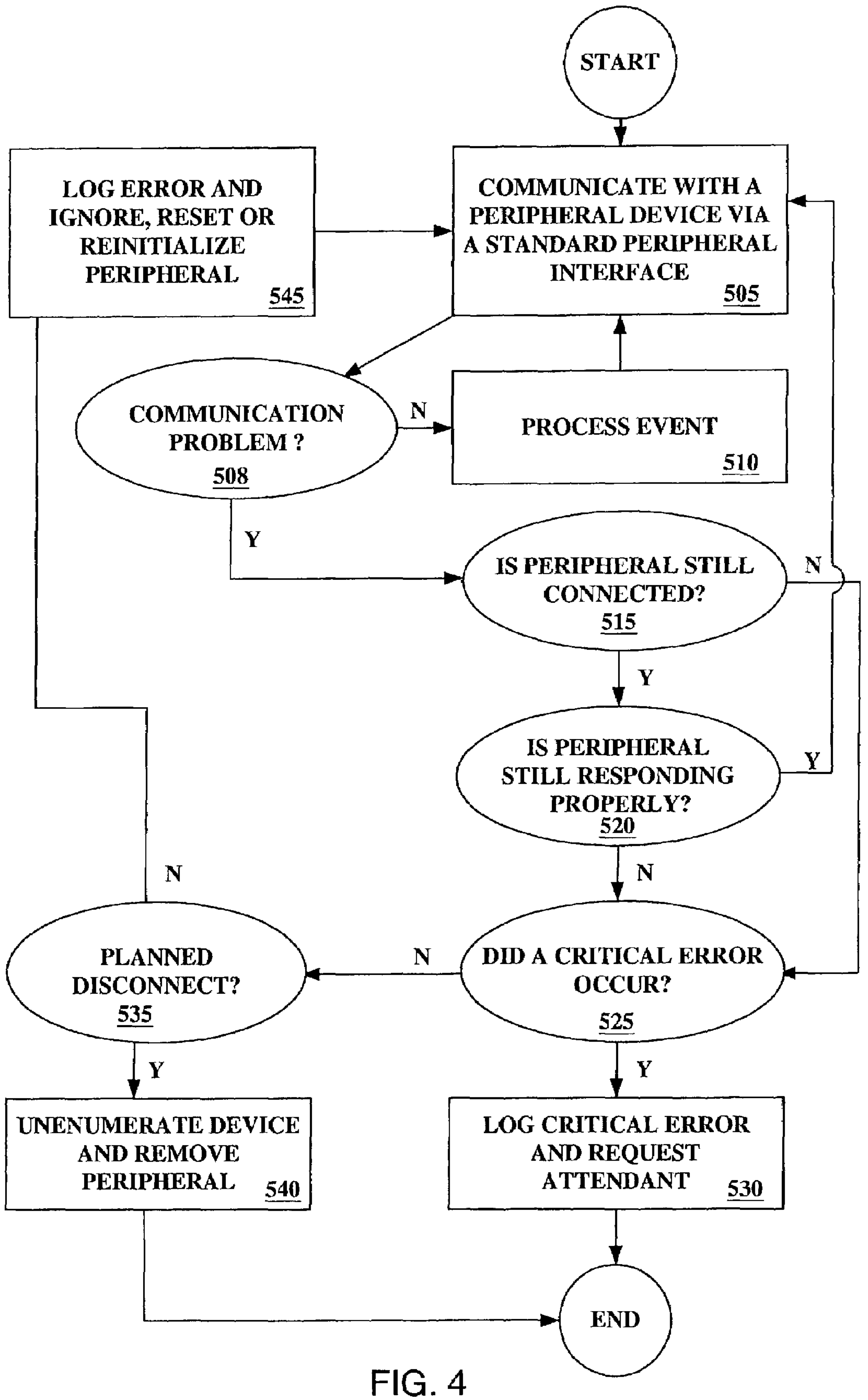
FIG. 4 is a flow diagram depicting the gaming peripheral power-up and communication process with the master gaming controller.

FIG. 4 is a flow diagram depicting an example of the gaming peripheral power-up and communication process with the master gaming controller. This process is described for one gaming peripheral. For a plurality of gaming peripherals, this process is implemented for each gaming peripheral. When a gaming peripheral loses power which may include an accidental power loss or planned maintenance for the gaming peripheral, the process in FIG. 4 is usually followed. When a gaming peripheral first receives power, the standard control microprocessor, as an example see 312 in FIG. 3, executes self-diagnostics to confirm the peripheral is operating properly in block 400. The control microprocessor will load software stored in its fixed memory. With this software the control microprocessor will execute a series of self-diagnostics to determine that its various components are operating properly. These tests may include testing the processor, timer, fail safe and master communication controller functions of the control microprocessor.

After the control microprocessor completes its self-diagnostics in block 400, the gaming peripheral's configuration and state history is loaded into the control microprocessor's volatile memory from non-volatile memory outside of the control microprocessor in block 410. The non-volatile memory stores information about the peripheral devices that are connected to the control microprocessor through the peripheral interface. This information tells the standard control microprocessor what type of gaming peripheral it is controlling. The control microprocessor loads the information stored in the non-volatile memory and loads code stored in the control microprocessor's fixed memory into volatile memory on the control microprocessor to operate the peripheral devices. In FIG. 3, the control microprocessor 312, the volatile memory 308, the fixed memory 310, the non-volatile memory 316, and the peripheral interface 318 are one possible embodiment of the hardware needed to implement the process in block 410. One possible example of configuration information, which might be stored in non-volatile memory, is information describing a light panel connected to the gaming peripheral. The non-volatile memory might store information including the type of light panel, the number of lights, the response time of the lights, the signal needed to turn the light on, the signal needed to turn the light off, the communication rate and the communication buffer size for the light. As another example, the non-volatile memory might store configuration information for a motor connected to the gaming peripheral, this information might include the type of motor, the signal needed to turn the motor on, the signal needed to turn the motor off, the response time of the motor, the communication buffer size and the communication rate for the motor.

In block 410, the control microprocessor loads the state history of the gaming peripheral from the non-volatile memory. The state history includes game information that describes states of the peripheral devices of a gaming peripheral that occur while a game is being played on a gaming machine. For example, state information stored in the non-volatile memory might include the amount of cash a player has entered into the machine, each step of the game, the choices a player has made during the game, the position of reels or the status of lights. When a gaming machine loses power or malfunctions during a game, the information stored in the non-volatile memory is used to restore the gaming machine to the state in the game that occurred just before the power loss or malfunction. In general, when a gaming machine is being powered-up, the gaming peripheral will initialize itself to a pre-determined "safe" state until the master controller connects to it. When communication is established between the gaming peripheral and master gaming controller, the control microprocessor may attempt to transfer relevant state history information it has retrieved from its non-volatile memory to the master gaming controller.

In block 420, after self-diagnostics and initializing itself to some state, the peripheral controller may test the peripheral devices that it controls. This step is optional. Examples of some tests the peripheral controller might execute include turning lights on and off on a light panel, printing a test ticket from a printer, displaying a test pattern on a video display screen, or projecting a sound pattern from a speaker.

In block 430, the peripheral controller establishes communication between the gaming peripheral and the master gaming controller. Using the standard communication connections and the standard communication protocol, the peripheral controller establishes communication with the master gaming controller. One embodiment of the hardware needed for this communication process between the peripheral controller and the master gaming controller is shown in FIG. 3. One example of the initial communication sequence and data exchange between the peripheral controller and master gaming controller can be represented as a series of high-level questions. A typical sequence to establish communication might proceed as a message from the master gaming controller including "is anyone there?" The peripheral controller might respond, "yes" and the master gaming controller might ask, "what type of device are you?" Then, the peripheral controller might respond, "I am a gaming peripheral of some type." To this question, the master gaming controller might respond, "what is your communication rate and buffer size?" The peripheral controller would send this information to the master gaming controller and the devices would continue to communicate. The questions described above are representative of the type of information that is passed between devices using a standard communication protocol. The actual information passed by the devices corresponding to the questions will be specific to the particular protocol.

There are many different standard communication protocols including USB or IEEE1394, and the like. Each of these protocols utilizes a standard communication sequence. But, the standard communication sequence may vary depending on the type of protocol that is used. When the master gaming controller is using a USB protocol to communication over the standard communication, the following information or a portion of this information might be exchanged between the master gaming controller and peripheral controller: 1) release specification number, 2) device class, 3) subclass (e.g. version) 4) device communication protocol and revision, 5) Maximum receive and send packet sizes, 6) vendor identification, 7) product identification, 8) device release number, 9) manufacturer string, 10) product string, 11) device descriptor, 12) device protocol, 13) serial number, and 14) number of configuration interfaces. The USB standard is widely-known and described in various references such as *USB Hardware and Software*, John Garney, Ed Solari Shelagh Callahan, Kosar Jaff, Brad Hosler, published by Annabooks 11838 Bernado Plaza Court, San Diego, Calif., 92128, copyright 1998, ISBN 0-929392-37-X, which is incorporated herein by reference for all purposes.

After establishing communication with the gaming peripheral, the master gaming controller queries the gaming peripheral for peripheral devices. This process is called the device enumeration sequence in block 440. One or more peripheral devices attached to the gaming peripheral may communicate with the master gaming controller or may be controlled by the master gaming controller during the course of a game. In this step, the master gaming controller requests device information from the peripheral controller. Again, the information exchange between the master gaming controller and peripheral controller can be represented as a series of high-level questions. The format of the information exchange may vary depending on the communication protocol being used. As an example, the first question from the master gaming controller to the peripheral controller might be "do you have any devices?" When the gaming peripheral replies "yes", the master gaming controller might ask "what is the device?" The peripheral controller will then send information to the master gaming controller, in some format or protocol established before the communication process began, as to the type of peripheral device. This device identification protocol is distinct from the communication protocol.

For certain devices requiring a higher level of security including but not limited to bill validators and coin acceptors, the master gaming controller might determine which port it is using. Using the device identification protocol and the port information, the master gaming controller may or may not communicate with the gaming peripheral. It may issue an error message and prevent further operation if the device is not using a required port. As a specific example, the master gaming controller may require that an electronic key (e.g., a software dongle) be inserted into to a port prior to operation of that port (as a security measure). When a peripheral device is subsequently connected into the port where an electronic key has been used, the master gaming controller may only communicate with certain types of devices that are allowed access into this port based on the information provided by the electronic key.

In block 450, the master gaming controller initializes one or more selected device drivers for the peripheral device identified in block 440. Using a device identification number or some other system for identifying the peripheral device, the master gaming controller selects a software device driver which will operate the features of the peripheral device enumerated in block 440. The master gaming controller first searches for a software driver which exactly corresponds to the peripheral device. When the master gaming controller can not locate a software driver which exactly corresponds to the peripheral device, the master gaming controller may search for a similar software driver that might operate all or some of the features of the peripheral device. Examples of peripheral devices which might be operated by a master gaming controller using a software driver include lights, printers, video display screens, coin counters, coin acceptors, bill validators, ticket readers, key pads, motors, and card readers. After choosing a software driver, the master gaming controller makes the software available for use. Usually, this is done by loading the software into memory. When a software driver can not be located for a particular peripheral device, the master gaming controller does not operate this device during the game. When the peripheral device without a software driver is critical for operation of the gaming machine, the master gaming controller may generate an error message.

In block 440, to select the software driver, the master gaming controller may use a device identification protocol. As an example, the device identification protocol might include a series of numbers which correspond to a specific peripheral device. As an example, combinations of the device class, manufacturer, device protocol and serial number information from a particular device might be used. From these numbers, the master gaming controller would be able identify the type of the peripheral device and its features. Related peripheral devices with similar features might have similar numbers. For example, two versions of a peripheral device, device A and device B might share in common one or more numbers including 11112 to denote device A and 11113 to denote device B. This is similar to the concept of an address mask in network technology. This selection process may vary depending on the peripheral's manufacturer and the driver implementation.

In block 460, the master gaming controller determines whether the device enumeration sequence is completed. When more devices need to be enumerated, the master gaming controller returns to block 440. In block 460, the master gaming controller might determine whether more devices need to be enumerated by querying the peripheral controller or the master gaming controller might know the number of peripheral devices connected to the gaming peripheral by its type. The type of the gaming peripheral was identified when communication was established in block 430. In block 470, when the enumeration process is completed for all the peripheral devices connected to a peripheral controller, the master gaming controller may look for additional peripheral devices connected to other peripheral controllers to enumerate and return to block 440. When all of the peripheral devices connected to all the peripheral controllers are enumerated, the process shown in FIG. 4 is complete.

One advantage of the enumeration and device driver initialization process in blocks 440, 450, 460 is that enumeration may occur at any time while the machine is running. For example, when lights connected to the gaming peripheral are not functioning, the lights could be removed from the gaming peripheral for repair and replaced with a new set of lights while the gaming machine is running and the master gaming controller might unenumerate the old lights and then enumerate the new lights. Potentially, the power-up and communication process in FIG. 4 might be carried out by the master gaming controller without intervention by an attendant or other maintenance person.

Figure 5:
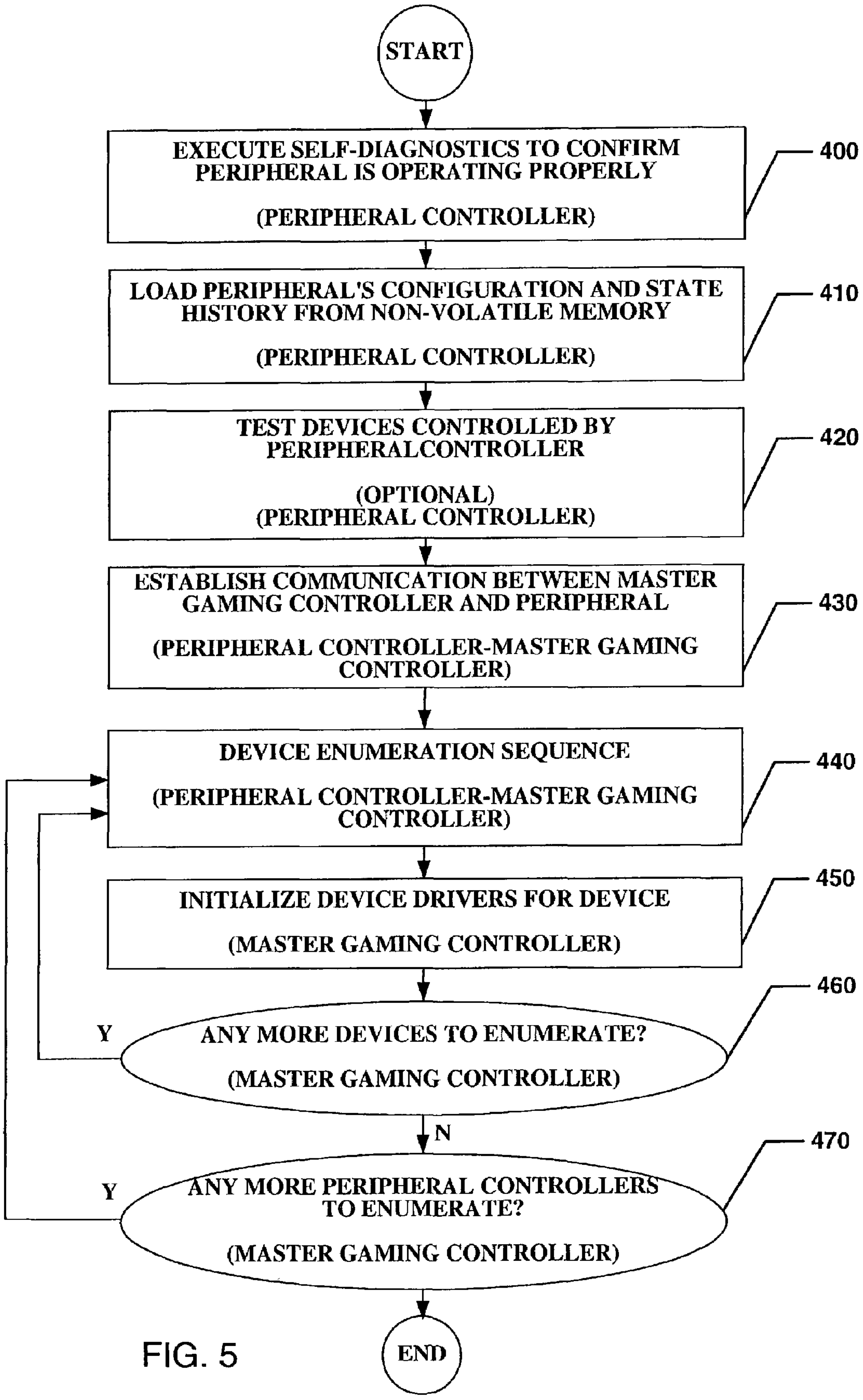
FIG. 5 is a flow diagram depicting the post power-up communication phase between the gaming peripheral and master gaming controller.

FIG. 5 is a flow diagram depicting the post power-up communication phase between the gaming peripheral and master gaming controller. In this figure, some of the possible communication and operational processes that occur between the master gaming controller and the gaming peripheral during the post power-up operational phase of the gaming machine are described. Some events that might occur during this phase include operating the gaming peripheral during the course of a game, operating the gaming peripheral between games, and operating the gaming peripheral during maintenance.

In block 505, communication with a peripheral device via a standard peripheral interface occurs. In one possible embodiment, this step may be initiated when the master gaming controller requests an operation or information from one of the peripheral devices comprising the gaming peripheral. In a preferred embodiment, the peripheral controller receives this message as a high level instruction and converts the instruction to one of more low-level instructions needed to operate or communicate with the peripheral device. The details of this step are described in FIG. 6. The low-level instructions from the peripheral controller are sent to the peripheral device via the peripheral interface. The peripheral device receives the instructions and performs the requested operation. As an example, a light panel might turn on a specific light or turn its lights on in a specific pattern including strobing or flashing. After performing the operation, the peripheral device may signal to the peripheral controller that the operation has been completed. In another step, the peripheral controller may verify to the master gaming controller that the requested operation was performed. In another possible embodiment, this step may be initiated when a peripheral device on the gaming peripheral is utilized. For example, a player wishing to start a game might insert a player tracking card into a card reader connected to the gaming peripheral. In this example, the card reader might send a message to the peripheral controller that a card has been inserted. Then, in another step, this message might be relayed to the master gaming controller in some format and a series of communication events between the gaming peripheral and master gaming controller might commence. This type of process where the communication sequence starts in the peripheral device might be occur for a number of different peripheral devices connected to the gaming peripheral including card readers, ticket readers, coin acceptors, bill validators, key pads, and button panels.

During the communication process in 505, a number of possible steps were identified where the peripheral controller might send information to the master gaming controller regarding the operation of a specific peripheral device. This communication step is called process event in block 510. The details of this process are described later in FIG. 7. When processing an event, critical information from a peripheral device, including but not limited to a coin being accepted by a coin acceptor, a ticket being read by a ticket reader, or a bill validator accepting a bill, is transmitted between the gaming peripheral and master gaming controller so that the information is preserved in the event of a power failure or malfunction during operation of the gaming machine. The communication step in block 510 requires that the peripheral controller and master gaming controller are communicating properly. In block 508, the communication between the master gaming controller and peripheral controller is checked. When normal communication between the master gaming controller and peripheral controller is verified, the event is processed in block 510. When the transaction in block 510 has been processed successfully, the communication between the peripheral controller and master gaming controller continues starting in block 505.

When a communication problem has been identified between the master gaming controller and peripheral controller, the process branches to block 515. During operation of the gaming machine in block 515, the master gaming controller may send signals to one or more of the peripheral devices connected to the peripheral controller to determine whether the peripheral device is still connected. For communication purposes, the master gaming controller views the peripheral controller and the peripheral device as one entity. When the peripheral controller is disconnected from the master gaming controller, the peripheral devices connected to the peripheral controller through the peripheral interface are no longer able to communicate with the master gaming controller and the master gaming controller might assume all the peripheral devices were disconnected. When a peripheral device is disconnected or no longer communicating with the peripheral controller, the peripheral controller, which is still able to communicate with the master gaming controller, might detect the disconnect and could send a message to the master gaming controller that the peripheral device is no longer communicating or connected to the peripheral controller. For example, a peripheral device may be accidentally disconnected from the peripheral controller as a result of faulty wiring between the peripheral controller and the peripheral device might cause a disconnection. In another example, a peripheral device might be intentionally disconnected from the gaming peripheral and peripheral controller for maintenance of the peripheral device. Further, in another example, the peripheral device might be disconnected from the gaming peripheral and peripheral controller and reconnected with another peripheral device to tamper with the gaming machine. In each of the cases, the master gaming controller is designed to detect the disconnection of the peripheral device. As an example, the USB communication protocol addresses this issue with the design of the communication bus and wiring. The peripheral controllers may assist in detecting disconnects whenever possible.

The communication between the peripheral controller and the master gaming controller may use "keep alive" messages which are regularly sent to the master gaming controller at specified intervals. When the master gaming controller does not receive this message after a specified interval, it may put the gaming machine or gaming peripheral into an error checking mode. Also, when the peripheral controller believes that a peripheral device has been disconnected, the gaming peripheral may be placed into an error checking mode by the peripheral controller.

In block 520, the master gaming controller may send a message to the peripheral device at specified intervals asking whether it is operating properly or the peripheral device may send a message to the master gaming controller at specified intervals affirming it is operating properly. The message may be in response to a request by the master gaming controller to perform a specific operation. For example, when the master gaming controller sends a message to a light panel to strobe its lights which is interpreted by the peripheral controller and sent to the light panel, the light panel might send a message back to the peripheral controller verifying that it is strobing its lights. As another example, the light panel or any other peripheral device may send regular messages to peripheral controller including "ready", "operational" or "performing operation". In the event the peripheral controller stops receiving these messages or similar messages, the peripheral controller may decide that the peripheral device is not responding properly and place the gaming peripheral into an error checking mode. Further, the peripheral controller may relay this message to the master gaming controller, which may place the gaming peripheral or gaming machine into an error checking mode. When the peripheral is connected and responding properly, the peripheral controller loops back to block 505 for the next communication event In block 525, when the peripheral controller or master gaming controller determines that a peripheral device may have been disconnected or that a peripheral device may be responding improperly, a decision is made as to the type of error and response. In block 530, when the peripheral controller or master gaming controller determines that a "critical error" has occurred, the peripheral controller or master gaming controller will log the error and request attendant. An attendant might be requested by lighting a light on the gaming machine or a message might be sent to a remote location requesting some response. A "critical error" is an event that requires external intervention for the machine to clear the error. For example, errors resulting from possible tampering with the gaming machine might result in a critical error. In block 535, when a non-critical error occurs, the peripheral controller or master gaming controller determines whether the error is the result of a planned disconnect.

In block 540, when a peripheral device is being removed as the result of a planned disconnect (e.g. planned maintenance), the master gaming controller will unenumerate the peripheral device and adjust its operation to reflect the device being removed. The unenumeration of the peripheral device might proceed in the reverse of the enumeration process described in FIG. 4. In the unenumeration process, the master gaming controller would unload the device driver for the disconnected peripheral device and stop communication attempts with the device. Depending on the peripheral device, the gaming machine might continue operating with the peripheral device disconnected. For example, when a light panel is disconnected from the gaming peripheral for repair, the gaming machine might continue operation without the light panel. The ability to unenumerate a device and keep operating is advantageous when the peripheral device can not be immediately repaired or replaced.

In block 545, in the event of a non-critical error that is not the result of a planned disconnect, the peripheral controller or master gaming controller may attempt to ignore, reset or reinitialize the peripheral, depending on the exact nature of the critical error. Further, the peripheral controller or master gaming controller may log this error in some type of event log. For example, in the process of printing a ticket, the printer may malfunction. When the printer malfunction is deemed a minor error, the peripheral controller or master gaming controller might reset the printer in block 545 and then start the communication process again in block 505 in attempt to print the ticket again. In another possible example, the master gaming controller might ignore the minor error and again request the operation from the device.

Figure 6:
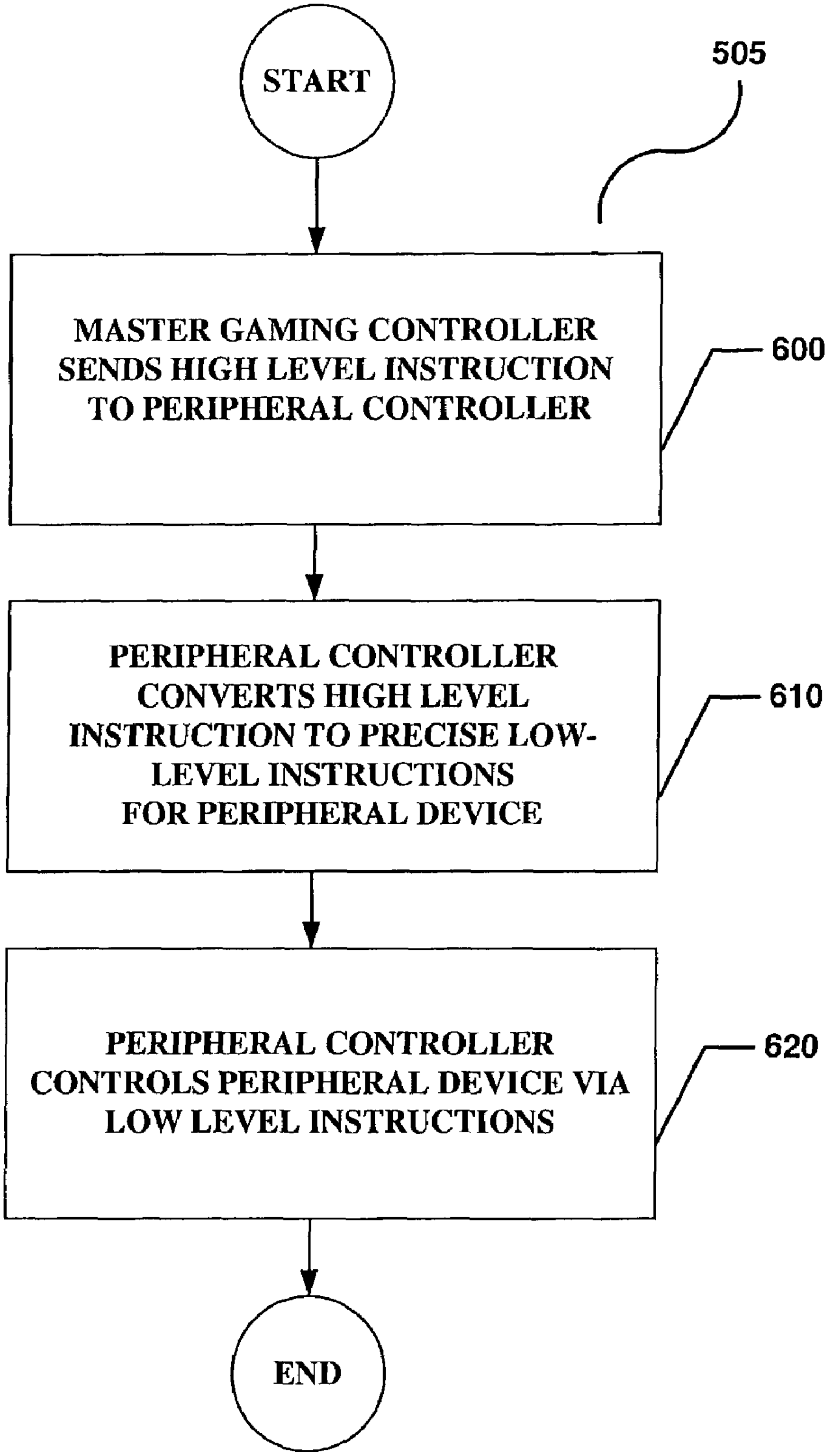
FIG. 6 is a flow diagram depicting the details of a general communication process of a peripheral device via a standard peripheral interface as presented in FIG. 5.

FIG. 6 is a flow diagram depicting some details of the communication with a peripheral device via a standard peripheral interface in block 505 in FIG. 5. In the power-up phase described in FIG. 4, the master gaming controller establishes communication with the gaming peripheral and selects software drivers for the peripheral devices the master gaming controller can operate. In block 600, the master gaming controller may use the software driver to send the peripheral controller a high-level instruction that requests the operation of a specific feature of the peripheral device. This high-level instruction is sent using the standard communication connection hardware and the standard communication protocol. A possible hardware embodiment of this process was shown in FIG. 2. For a light panel, examples of a potential high-level instructions might include "strobe lights", "flash lights", "implement light pattern A", or "implement light pattern B". For a ticket printer, examples of potential high-level instructions might include "print a ticket for 10 game plays", "print a coupon for restaurant A", or "print a coupon for hotel A." Further high-level instructions might be sent to other types of peripheral devices including button panels, video display screens, card readers, motors, key pads, bill validators, coin acceptors, and information panels. In block 610, the peripheral controller receives a high-level instruction for a peripheral device and converts the high-level instruction into to one or more low-level instructions that are needed to perform the specific operation on the peripheral device. For example, a high-level instruction from the master gaming controller to "strobe lights" on a light panel with 3 lights connected to the gaming peripheral might be converted to a sequence low-level instructions including "turn on light 1", "wait 100 milliseconds," "turn off light 1", "turn on light 2," "wait 100 milliseconds", "turn off light 2", "turn on light 3." In block 620, the peripheral controller sends the device specific low-level instructions through the peripheral interface to the peripheral device. The sequence of low-level instructions sent from the peripheral controller allow the peripheral device to perform the operation requested by the master gaming controller.

Figure 7:
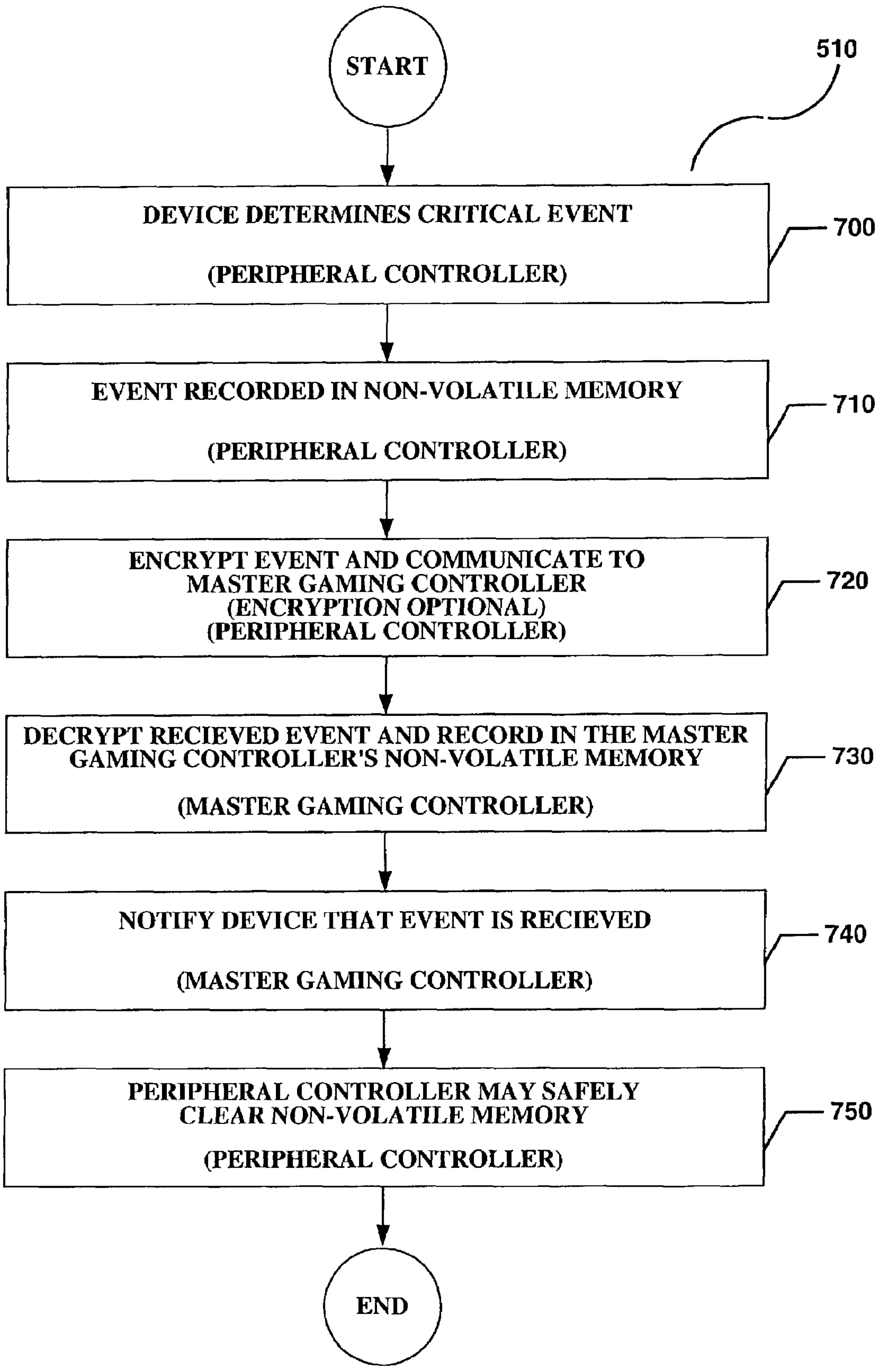
FIG. 7 is a flow diagram depicting the details of a general event transaction as presented in FIG. 5.

FIG. 7 is a flow diagram depicting the details of the EVENT TRANSACTION step in block 510 in FIG. 5. While the gaming machine is operating and particularly when a player is playing a game, the peripheral controller and master gaming controller may attempt to store information on some events that occur on one or more of the peripheral devices. Typically, the critical events are stored in non-volatile memory on both the peripheral controller and the master gaming controller to ensure that in the event of a power failure or some other malfunction within the gaming machine during a game, critical event information is not lost. In the event of a power failure or some other malfunction within the gaming machine which interrupts a game, this critical event information can be used to determine the state of the gaming machine and game before the interruption.

In block 700, the first step in an event transaction between the peripheral controller and the master gaming controller is shown. In block 700, the peripheral device sends some information to the peripheral controller through the peripheral interface. The peripheral controller receives the data from the peripheral device and decides whether the information constitutes a critical event. A few possible examples of critical events might be the coin acceptor acknowledging a coin drop, the bill validator acknowledging receiving cash or the ticket reader receiving a ticket for game play. In block 710, when the peripheral controller decides the information from the peripheral device is a critical event, the peripheral controller may send all or portion of the data for storage in non-volatile memory on the peripheral controller. A potential hardware embodiment of this process is shown in FIG. 3. In block 720, after recording the critical event information in non-volatile memory, a copy of the critical event information, which may be encrypted, is sent to the master gaming controller using the standard communication protocol and standard communication connections. The critical event information may include a sequence number to avoid duplicate transactions. In block 730, the master gaming controller receives the critical event information. When the information is encrypted, the master gaming controller decrypts the information. All or a portion of the information received from the peripheral controller is stored in non-volatile memory on the master gaming controller. In block 740, the master gaming controller sends a notification back to the peripheral controller that the critical event sent from the peripheral controller was received. In block 750, after receiving this notification message from the master gaming controller, the peripheral controller may clear information from a previous critical event from its non-volatile memory.

Although the foregoing invention has been described in some detail for purposes of clarity of understanding, it will be apparent that certain changes and modifications may be practiced within the scope of the appended claims. For instance, while the gaming machines of this invention have been depicted as having gaming peripherals physically attached to a main gaming machine cabinet, the use of gaming peripherals in accordance with this invention is not so limited. For example, the peripheral features commonly provided on a top box may be included in a stand along cabinet proximate to, but unconnected to, the main gaming machine chassis.

What is claimed is:

1. A method of enumerating peripheral devices connected to a gaming machine, the method comprising:

providing the gaming machine comprising a) a housing, b) one or more gaming peripherals coupled to the housing wherein each gaming peripheral comprises one or more peripheral devices and a peripheral controller, c) a master gaming controller coupled to the housing and operable to communicate with each gaming peripheral, d) an input mechanism coupled to the housing adapted for receiving cash or indicia of credit and e) an output mechanism coupled to the housing for outputting cash or indicia of credit wherein the master gaming controller adapted for controlling the one or more gaming peripherals to present a game of chance to a user of the gaming machine and wherein under control of the master gaming controller the gaming machine is operable i) to receive the cash or indicia of credit for a wager on the game of chance and ii) to output the cash or an indicia of credit as an award for the game of chance resulting from said wager, providing one or more secure communication ports with a higher level of security than one or more other communication ports wherein a first peripheral device is operable to communicate via the one or more secure communication ports with the master gaming controller or via the one or more other communication ports with the master gaming controller and wherein the master gaming controller is configured to require that the first peripheral device only communicate through the one or more secure communication ports;

establishing, under control of the master gaming controller, communications between each of the gaming peripherals and the master gaming controller;

determining, under control of the master gaming controller, whether one or more peripheral devices on each gaming peripheral is authorized to communicate with the master gaming controller;

querying, under control of the master gaming controller, each of the gaming peripherals for peripheral devices;

determining, under control of the master gaming controller; an identity of the first peripheral device and a first communication port through which the first peripheral device is attempting to communicate and allowing communications with the first peripheral device when the first communication port is a secure communication port;

for each peripheral device, loading a device driver for controlling one or more features of the peripheral device;

controlling operation of each peripheral device using the device driver for the peripheral device;

storing critical information on the master gaming controller relating to each of a plurality of steps in the game of chance that are displayed during a play of the game of chance wherein the critical information includes information relating to player choices made during the play of the game of chance and wherein in an event of a malfunction during the play of the game of chance the master gaming controller is operable to restore the game of chance to a step in the game of chance that was displayed just prior to the malfunction using the stored critical information, and generating, under control of the master gaming controller, the game of chance on the gaming machine.

2. The method of claim 1, further comprising:

communicating with each of the gaming peripherals using the same communication protocol.

3. The method of claim 2, wherein the same communication protocol is at least one of a USB communication protocol or a IEEE 1394 compatible communication protocol.

4. The method of claim 1, further comprising:

receiving one or more communication parameters from the gaming peripheral wherein the communication parameters are selected from the group consisting of a release specification number, a device class, a subclass, a device communication protocol, a maximum receive packet size, a maximum send packet size, a vendor identification, a product identification, a device release number, a manufacturer string, a product string, a device descriptor, a device protocol, a serial number and a configuration interface.

5. The method of claim 1, further comprising:

sending one or more communication parameters to the gaming peripheral wherein the communication parameters are selected from the group consisting of a release specification number, a device class, a subclass, a device communication protocol, a maximum receive packet size, a maximum send packet size, a vendor identification, a product identification, a device release number, a manufacturer string, a product string, a device descriptor, a device protocol, a serial number and a configuration interface.

6. The method of claim 1, wherein the peripheral devices are selected from the group consisting of lights, printers, coin counters, bill validators, ticket readers, card readers, key pads, button panels, display screens, speakers, information panels, motors, mass storage devices and solenoids.

7. The method of claim 1, further comprising:

identifying a communication port through which a peripheral device is communicating.

8. The method of claim 1, further comprising:

identifying a type of the peripheral device.

9. The method of claim 1, further comprising:

identifying a communication port through which a peripheral device is communicating;

identifying a type of the peripheral device;

when the communication port and the type of the peripheral device match communication port requirements for the type of the peripheral device, establishing communications with the peripheral device.

10. The method of claim 1, further comprising:

identifying the features of the peripheral devices.

11. The method of claim 1, further comprising:

receiving a device identifier in a device identification protocol for a first peripheral device on a first gaming peripheral from the first gaming peripheral;

identifying at least one of a device type and operating features of the first peripheral device using the device identifier.

12. The method of claim 11, further comprising:

selecting a device driver for the first peripheral device using the device identifier.

13. The method of claim 1, further comprising:

determining that the master gaming controller has no device driver precisely matching a first peripheral device on the gaming peripheral; and identifying an available device driver that meets at least some requirements for controlling the first peripheral device.

14. The method of claim 1, further comprising determining that a first peripheral device on a first gaming peripheral has been disconnected or is no longer communicating with the master gaming controller; and removing the software device driver for the first peripheral device.

15. The method of claim 14, further comprising:

controlling operation of a second peripheral device on the first gaming peripheral different from the first peripheral device.

16. The method of claim 1, wherein the communications are established with each of the gaming peripherals during a power-up phase for the gaming machine.

17. The method of claim 1, further comprising:

establishing communications with a first gaming peripheral during an operational phase for the gaming machine without interrupting communications between the master gaming controller and a plurality of gaming peripherals already in communication with the master gaming controller.

18. The method of claim 1, further comprising:

terminating communications with a first gaming peripheral during an operational phase for the gaming machine without interrupting communications between the master gaming controller and a plurality of gaming peripherals already in communication with the master gaming controller.

19. The method of claim 1, further comprising:

generating the game of chance using one or more of the peripheral devices.

20. The method of claim 1, wherein the game of chance is at least one of a mechanical slot game, a video slot game, a video poker game, a video lottery game or a video keno game.

21. The method of claim 1, further comprising:

identifying the features of each of the peripheral devices using a device identification protocol.

22. The method of claim 21, wherein the device identification protocol is a number assigned to each peripheral device.

23. The method of claim 21, further comprising:

selecting the device driver for controlling each of the peripheral devices using the device identification protocol.

24. The method of claim 1, wherein a first gaming peripheral comprises a plurality of peripheral devices and wherein a separate device driver is loaded to operate the one or more features of each peripheral device on the first gaming peripheral.

25. The method of claim 1, further comprising:

when a first gaming peripheral is not authorized for communications, terminating communications with the first gaming peripheral.

26. The method of claim 1, wherein authorization to communicate is determined using one or more of port information and a device identification protocol.

* * * * *